Inventor
DENNIS I. LAWSON
ARTHUR V. LORD
By Emery Holcombe & Blair
Attorney

Inventor
DENNIS I. LAWSON
By ARTHUR V. LORD
Emery, Holcombe & Blair
Attorney

Inventor
DENNIS I. LAWSON
ARTHUR V. LORD
By Emery Holcombe & Blair
Attorney

Inventor
DENNIS I. LAWSON
ARTHUR V. LORD
By Emery Holcombe & Blair
Attorney

Inventor
DENNIS I. LAWSON
By ARTHUR V. LORD
Emery Holcombe & Blair
Attorney

Inventor
DENNIS I. LAWSON
ARTHUR V. LORD
By Emery Holcombe & Blair
Attorney

Patented Jan. 6, 1953 2,624,797

UNITED STATES PATENT OFFICE 2,624,797

TELEVISION SYSTEM

Dennis Illingworth Lawson and Arthur Valentine Lord, Cambridge, England, assignors to Pye Limited, Cambridge, England, a British company Application October 12, 1946, Serial No. 703,084
In Great Britain October 12, 1945

6 Claims. (Cl. 178—5.6)

The present invention relates to television systems in which a series of pulses which are modulated by the sounds corresponding to the transmitted picture, or are used for control purposes, are incorporated in the interline blanking period of the television waveform so that the vision signals, the synchronising signals and the said pulses are all transmitted over a single channel or on a single carrier wave.

The present invention more particularly relates to a combined sound and television system in which a series of pulses modulated in accordance with the sound accompanying the scene or action to be televised are incorporated in the interline blanking period of the vision waveform.

It has been previously proposed to transmit the sound programme accompanying the scene or action televised by means of modulated pulses which are incorporated in the interline blanking period of the vision waveform. In British Patent No. 434,890, dated April 8, 1933, and entitled "Improvements in or Relating to Sound, Television and like Transmitting Systems," a system is proposed in which the sound is stored over the line period and transmitted in the synchronizing period. Further, in U. S. Patent No. 2,227,108, filed February 19, 1937, entitled "Signalling System," a television system is proposed in which the pulses are placed in the synchronising period, the height or width of any pulses being determined by the modulating voltage at the instant the pulse occurs. These pulses were limited in height to the picture black level. A further arrangement is suggested in British Patent No. 564,511, filed January 7, 1943, entitled "Improvements in or Relating to Combined Television and Sound Systems" in which the height of the pulses was increased to even greater than the peak white value of the picture. This enables separation of the sound from the picture waveform by a simple limiting arrangement in the receiver. That patent describes a system in which the pulses occur at the beginning of the picture period. Such sound pulses would appear on the picture unless a large blanking voltage waveform, which must be steep sided, is applied to blank off the sound pulse.

The present invention has for an object to provide a combined sound and television system of the above type which can, as has been proved by public demonstrations, be carried out in practice without detriment to the quality of the pictures reproduced and without interference with the picture synchronisation, and in which the sound reproduction is, with the existing television standards of definition, of a quality which is acceptable to the ordinary radio listener.

According to one feature of this invention, the sound modulation is applied to the pulse modulating circuit of the transmitter through a low-pass filter having a cut-off frequency which is not greater than one half of the pulse repetition frequency. In this way distortion of the sound transmitted due to interference between the lower sideband and the modulation frequency may be eliminated. According to a further feature, the receiver likewise incorporates a low-pass filter having a cut-off frequency which is not greater than one half of the pulse repetition frequency, for avoiding interference between the lower sideband and the modulation frequency which would otherwise occur in the receiver.

A further feature of the invention consists in positioning the sound pulses in the synchronising pulses in such a manner that they are spaced from both the leading and trailing edges of the line synchronising pulses and such that the leading edge of a pulse always occurs with a minimum separation from the line synchronising edge of the synchronising pulse which exceeds the length of the pulse given by the line oscillator. In this way interference with the synchronisation of the pictures by the sound pulses may be avoided. Further, by positioning the sound pulses within the synchronising pulses, the blanking problem is much easier, which leads to a simplification of the receiver, whilst furthermore, since the sound pulses are referred to a constant level throughout the complete waveform, pulse interference during the frame synchronising periods is also eliminated.

Thus, with such a disposition of the sound pulses in a standard British television waveform, the sound pulses will extend in a positive direction from the bases of the synchronising pulses. The minimum separation of the leading edge of the sound pulse from the negative going line synchronising edge of the vision waveform in order to prevent the sound pulses from affecting the sound synchronising of the vision receiver will be determined by the length of the pulse given by the line oscillator, for if the sound pulse occurs before the line oscillator pulse is completed the line synchronisation will be affected. In the existing British system this line oscillator pulse has a duration of about 2 microseconds and on allowing 2 microseconds safety margin it will be seen that the sound pulse must always occur more than 4 microseconds after the synchronising edge. By keeping the sound pulse also clear of the positive going trailing edge of the synchronising pulse, it is prevented from penetrating into the television picture. A safety margin of 1 microsecond is sufficent in the existing British television waveform.

The pulses may be modulated in amplitude, phase, frequency or width, but are preferably modulated in width with the leading edge of the pulse varying and the trailing edge fixed at the desired distance from the trailing edge of the synchronising pulse.

The amplitude of the sound pulses which are preferably constant may be such that the pulses extend above the peak white amplitude of the picture intelligence so that they may be separated in the receiver by a simple limiting arrangement. Alternatively, they may be of smaller amplitude than the picture intelligence and be separated in the receiver by the method described in United States Patent No. 2,563,684, dated August 7, 1951.

A still further feature of the invention consists in transmitting sound pulses as pulses of constant amplitude which are modulated in phase, frequency, or width, and in limiting both the tops and bottoms of the pulses in the receiver so that in effect a slice is cut out of each pulse and fed to the demodulator. In this way the ragged top and bottom regions of the pulses are cut off and an improved signal to noise ratio is obtained in the reproduced sound.

If the sound pulses are separated from the picture intelligence by a simple limiting arrangement as described in the specification of British Patent No. 564,511 or United States Patent No. 2,563,684, dated August 7, 1951, the bottoms of the pulses are automatically cut off and it is then only necessary to limit the tops of the pulses in order to obtain the advantages of this feature of the invention.

According to a further feature of the invention the pulses, whether they be positioned as above described or in other positions, may be used for the transmission of stereophonic sound or for colour switching in a colour television system. In this latter application the pulses may, if desired, also simultaneously be used for the transmission of sound.

For the purpose of using the pulses for stereophonic sound, pulses of constant amplitude and modulated in width, phase or frequency may be periodically switched in amplitude so that successive pulses or series of pulses correspond to the sounds picked up from different locations, the amplitude variation of the pulses controlling switching means in the receiver for directing the series of sound pulses to the corresponding reproducing devices. Likewise the amplitude of the pulses may be varied for controlling switching in colour television, the pulses being modulated in width, phase or frequency to carry the sound signals. In this case the amplitude would be varied from frame to frame corresponding to the different colours to be reproduced. Similarly, with pulses which are height modulated, colour switching may be obtained by varying the phase of the pulses.

Since the width of the line synchronising pulses (and the interline blanking period) varies inversely as the number of lines and the width of the pulses necessary for transmitting the sound intelligence varies inversely as the square of the number of lines, it will be seen that the space available for the transmission of sound pulses increases with the number of lines and it becomes possible to position two or more pulses within each synchronising pulse or interline blanking period. According to another feature of the invention, therefore, two or more pulses are transmitted within each synchronising pulse or during each interline blanking period, which pulses may be used for the transmission of stereophonic sound. Alternatively, one or more of the pulses may be used for transmitting sound or stereophonic sound signals, and another pulse be used for colour switching in a colour television system.

Further features of the invention and novel circuit arrangements and devices for carrying out the invention will be apparent from the following description in conjunction with the accompanying drawings, in which Fig. 1 shows various waveform diagrams for explaining the television system according to this invention;

Figure 4:
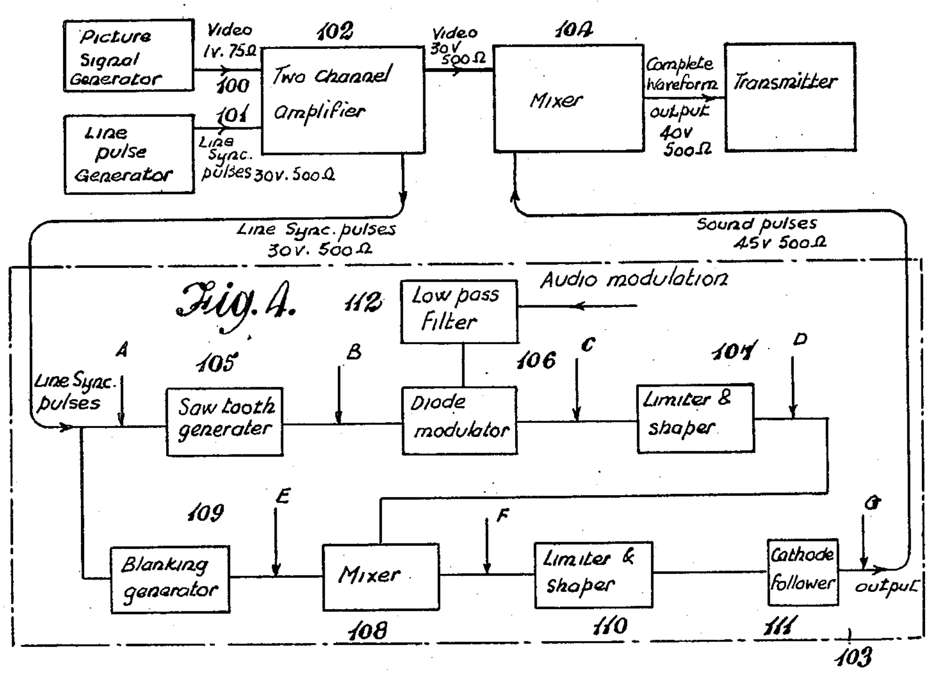
Figure 5:
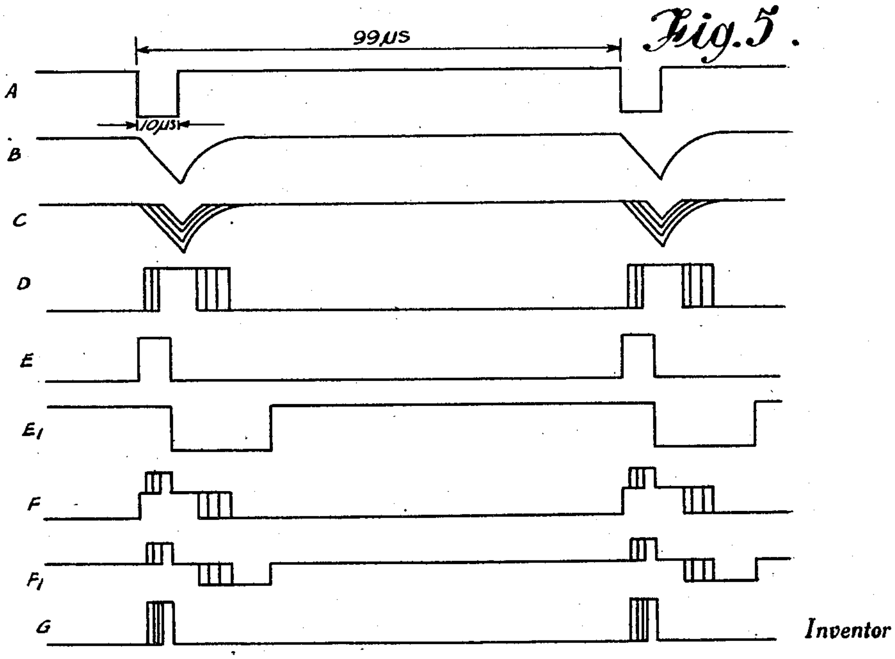
Figure 6:
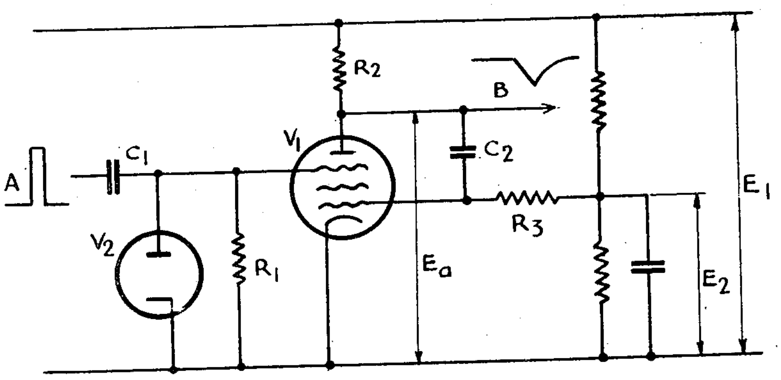
Figure 7:
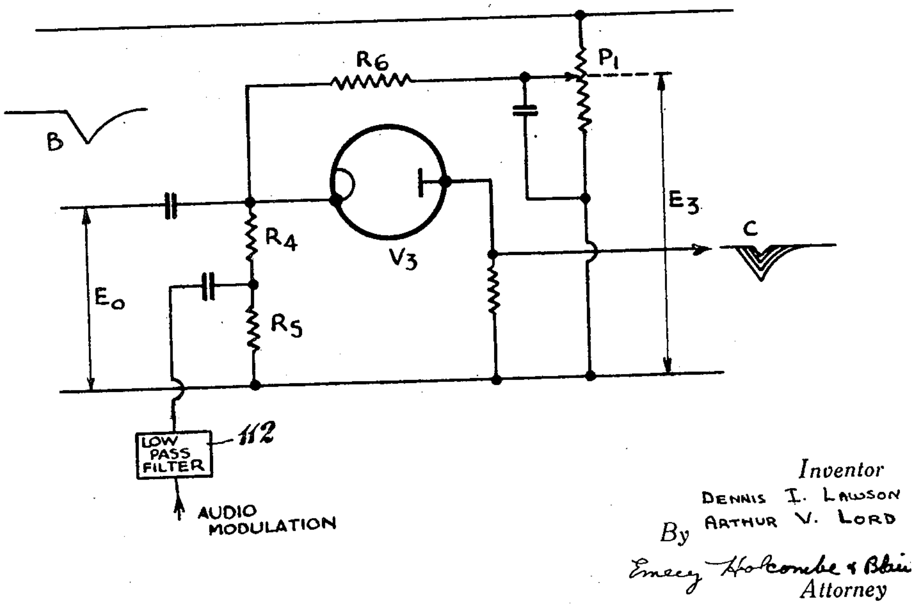
Figure 8:
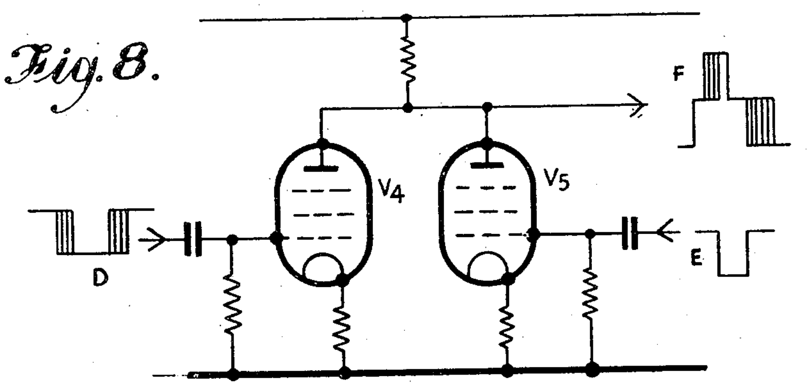
Figure 9:
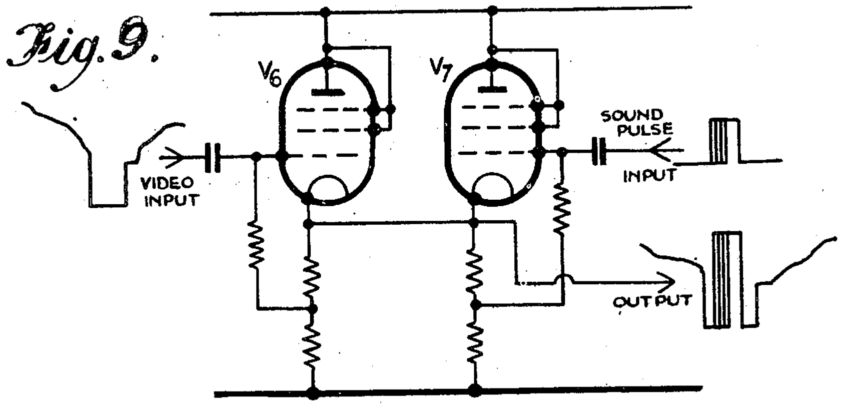
Figure 12:
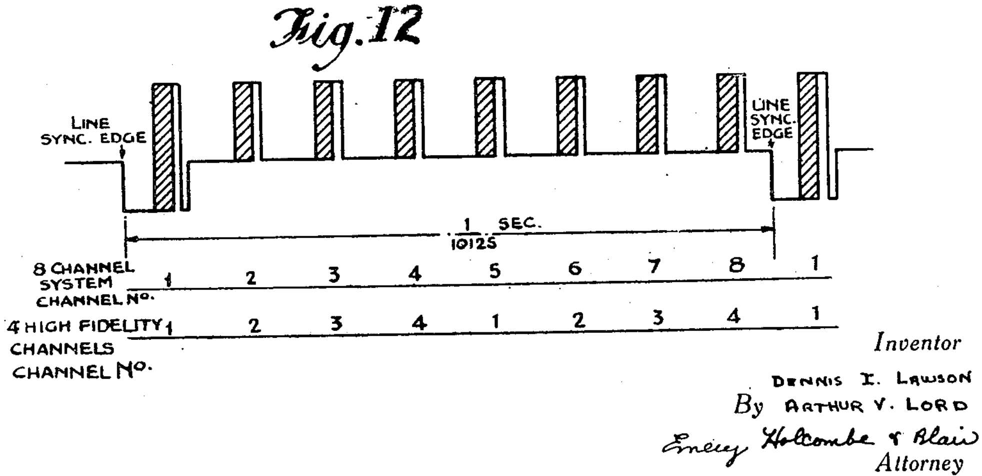
Figure 10:
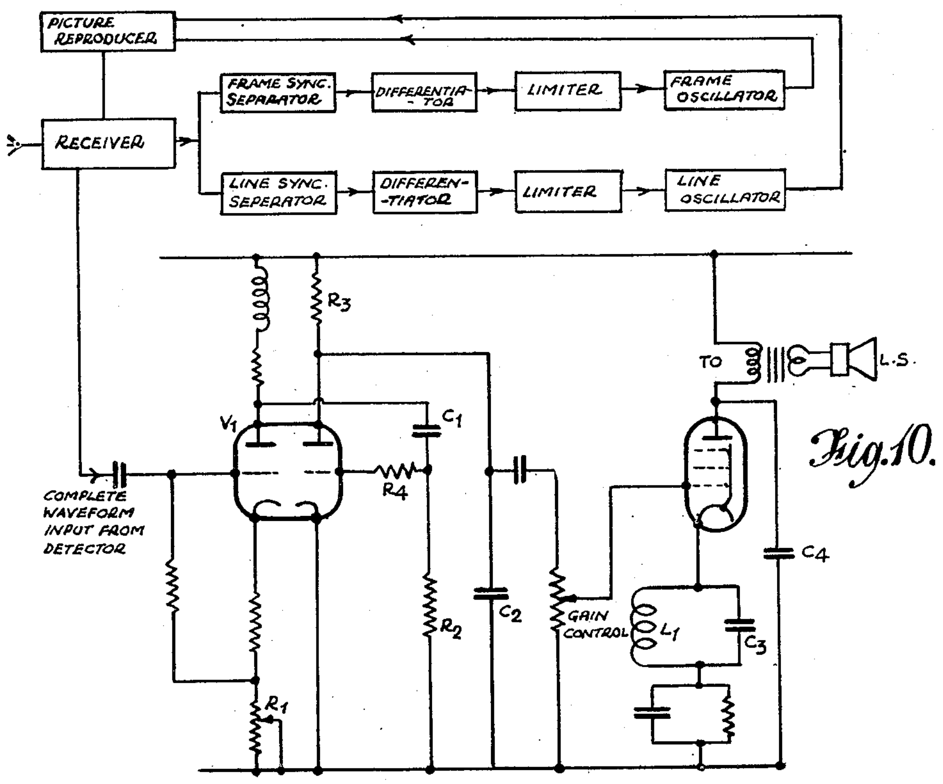
Figure 11:
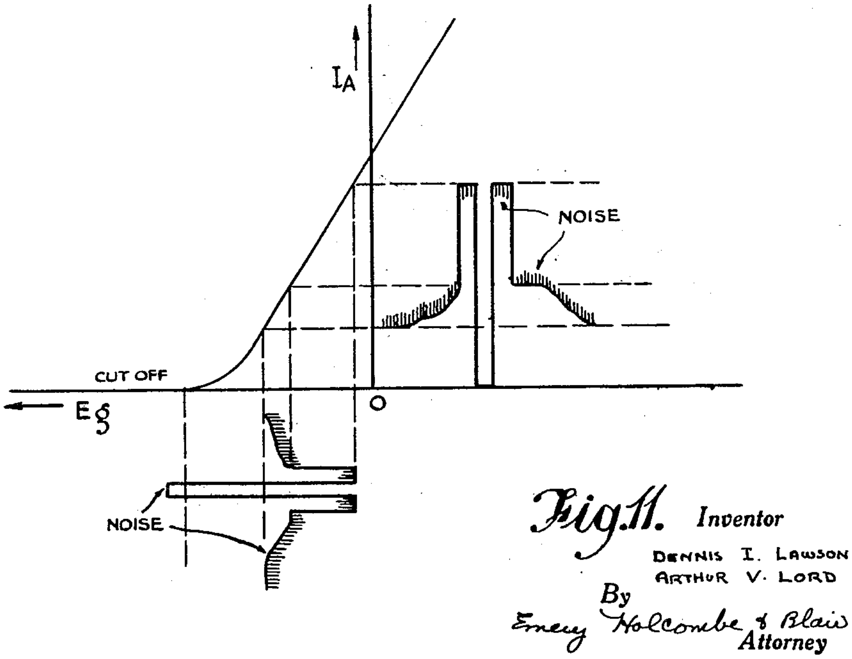

Fig. 4 shows a schematic diagram of the transmitter circuit including the width modulated pulse generator, Fig. 5 shows the waveforms associated with the production of the width modulated pulses, Fig. 6 shows the integrating circuit of the waveform generator, Fig. 7 shows the diode modulating circuit, Fig. 8 shows the blanking circuit for width-modulated pulses, Fig. 9 shows the sound pulse and vision mixing circuit, Fig. 10 shows the circuit diagram of the sound receiver, Fig. 11 shows the method of biassing the receiver to cut off noise at the peaks of the sound pulses, Fig. 12 shows a waveform for a multi-channel broadcast system using part of the television waveform.

In order to transmit the sound programme by means of pulses occurring in the synchronising interval one of the pulse parameters must be a function of the modulating potential occurring at the instant of the pulse.

Figure 1:
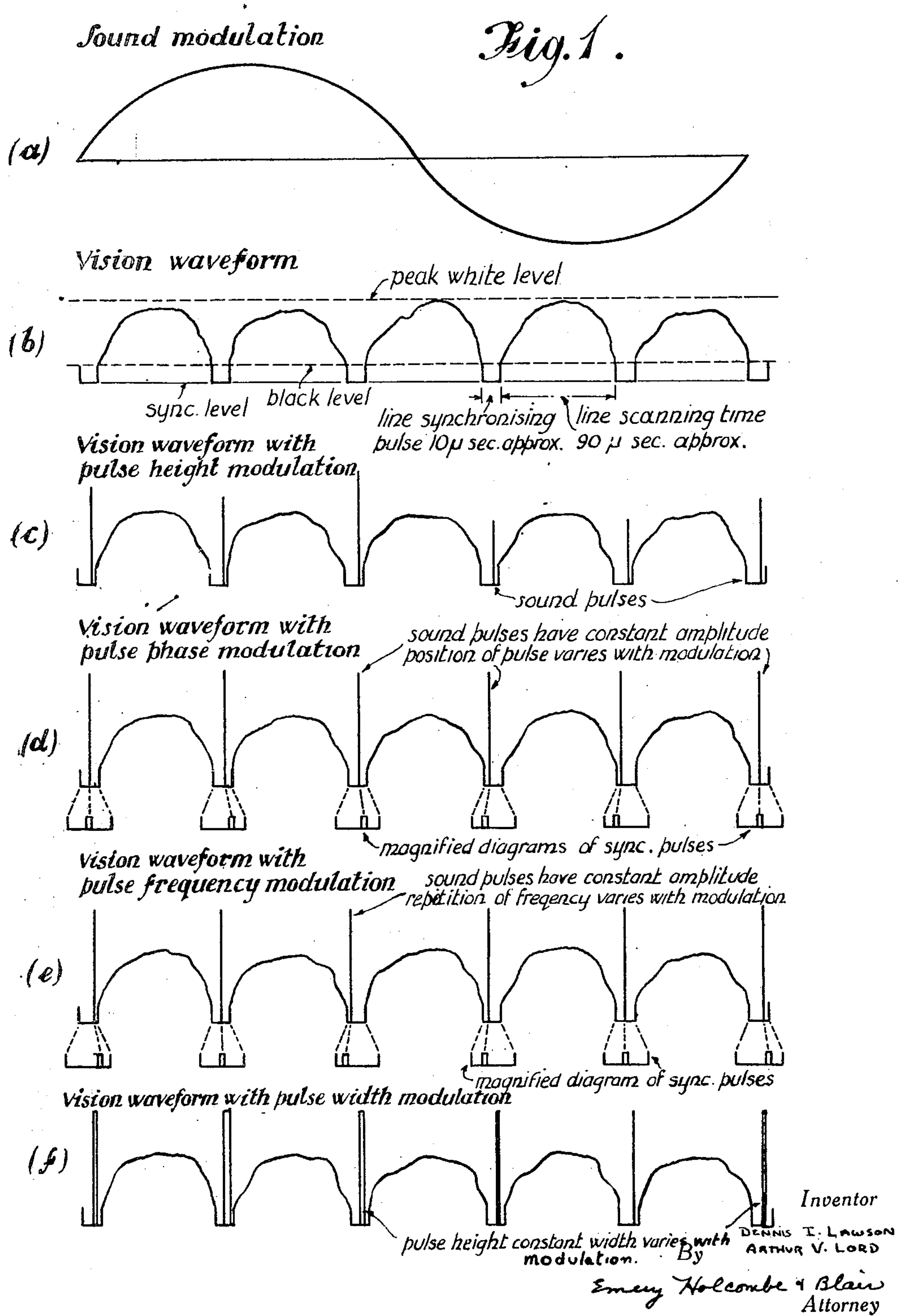

Fig. 1 shows the sound modulation to be transmitted (Fig. 1*a*) and the usual vision wave form (Fig. 1*b*) according to the present British television system. Figs. 1*c* to 1*f* show the composite vision and sound waveforms in which the following different pulse parameters are modulated.

*Fig. 1c.—Pulse height modulation.*—The pulses are of constant width but of varying height.

*Fig. 1d.—Pulse phase modulation.*—The pulses are of constant width and amplitude, their positions being displaced from a mean position in accordance with the modulation as shown in the magnified diagram of the synchronising pulses.

*Fig. 1e.—Pulse frequency modulation.*—The pulses are again of constant width and amplitude, the repetition frequency of the pulses varying with the modulation.

*Fig. 1f.—Pulse width modulation.*—The pulse height remains constant, its width varying with the modulation.

The modulation component of the pulses, after filtering, depends on two quantities, namely, the modulation index and the mean pulse width. A limit is set to these quantities by the fact that the sound pulses must not affect the line synchronising of the vision receiver and the sound pulse must therefore be kept clear of the negative going line synchronising edge A (Fig. 2) of the vision waveform. The minimum separation will be determined by the length of the pulse given by the line oscillator, for if the sound pulse occurs before the line oscillator pulse is completed, the line synchronisation will be affected. This line oscillator pulse has, in the British television system, a duration of about 2 microseconds, and on allowing 2 microseconds safety margin it will be seen that the sound pulse must always occur more than 4 microseconds after the synchronising edge. The sound pulse must also be kept clear of the positive going edge B, Fig. 2, of the synchronising pulse, or it will penetrate into the television picture. A safety margin of 1 microsecond is allowed here so that the sound pulse must never occur outside the region extending 9 microseconds from the synchronising edge A.

Figure 2:
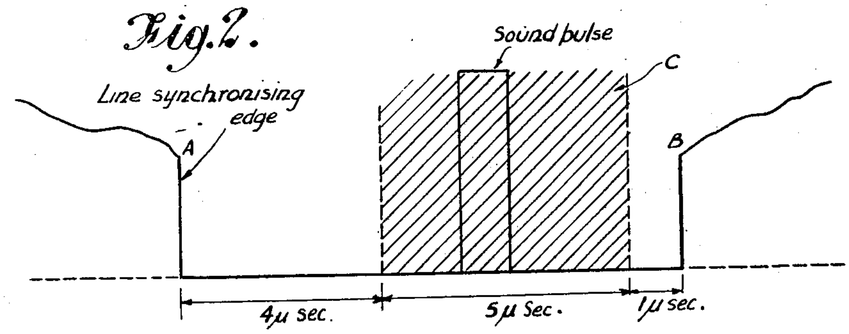
Fig. 2 is an enlarged representation of a synchronising pulse and showing the disposition of a sound pulse therein.

The total period allowed for sound modulation is therefore the 5 microseconds shown in the shaded area C in Fig. 2. In the case of width modulation it is a feature of this invention to vary the edge of the sound pulse adjacent to the synchronising edges A and A′ as shown in Fig. 3*a* which ensures that all negative going edges of the pulses C and C′ after differentiation, occur at a constant time after A and A′. Thus after differentiation, as shown in Fig. 3*c*, all negative pulses are free from modulation and the negative synchronising pulses A and A′ will be unaffected by the sound programme. Fig. 3*b* shows the waveform at the anode of the synchronising separator valve.

As regards the effect of the sound pulses on frame synchronisation, each of the charging spaces in the frame synchronising period has a duration of 40 microseconds. The first charging space on even and odd frames will differ, since a sound pulse will appear in the space following an even frame. After even frames the relevant charging process will not occur until 9 microseconds after the beginning of the frame synchronising period. If the charging is sensibly linear, this will cause an interlace error of 9/40 or about 20%. This does not seem to affect the quality of the picture, but may, if desired, be completely avoided by the application of line blanking pulses to the synchronisation separator circuits as described in the specification of copending Ser. No. 718,560, filed December 26, 1946.

Figure 3:
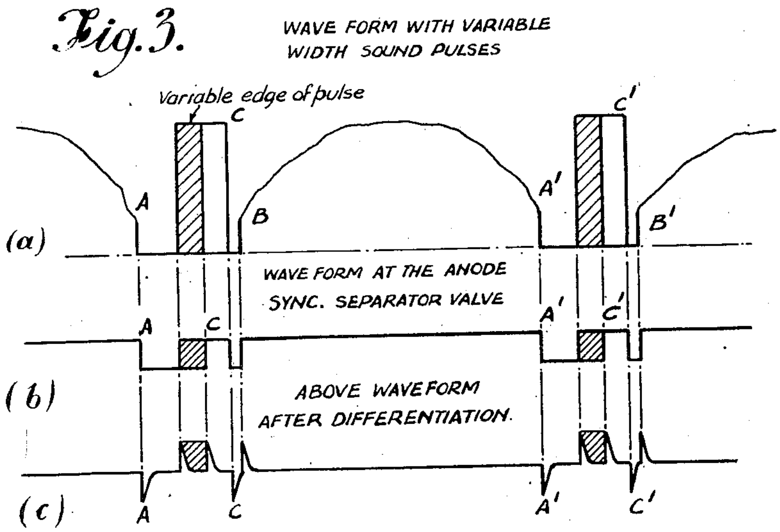
Fig. 3 shows a waveform with variable width sound pulses.

The preferred system according to the invention employs width modulated pulses of which the trailing edges are fixed and the leading edges vary in accordance with the modulation as illustrated in Figure 3, and the following description refers to such a system.

The spacing available for sound pulse modulation is 5 microseconds, and under peak modulation conditions the pulse width will be $\tau_0(1+m_w)$, where $\tau_0$ is the mean pulse width and $m_w$ is the modulation index. The problem is to proportion $\tau_0$ and $m_w$ to make their product and therefore the modulation amplitude a maximum. By inspection it will be seen that $\tau_0$ should be made as small as possible and $m_w$ should be made very large, but since $m_w$ cannot exceed unity the minimum value for $\tau_0$ is 2.5 microseconds. This would entail the pulse having zero width during the modulation troughs. The narrowest pulse usable will be determined by the pass band of the television receiver. This minimum width has been fixed at 1 microsecond for experimental investigations and $\tau_0$ thus becomes $$\frac{1+5}{2}=3 \text{ microseconds}$$

The modulation index $m_w$ is therefore 2/3. The width modulated pulses are separated from the vision waveform by cutting the pulses above the peak white level of the picture. The receiver will pass a signal of about 1.4 times the peak white level before overloading occurs, but the cutting must take place at about 1.2 times this peak white level for satisfactory separation of the sound signals from the vision.

*Transmitting circuits*

The transmitting apparatus comprises the usual vision generator and synchronising pulse generator and also means for generating and modulating the sound pulses and mixing them with the vision waveform. The general layout of the transmitter is illustrated in the schematic diagram shown in Figure 4. The video output and the line synchronising pulses obtained from the master pulse generator unit are fed over terminated co-axial cables 100 and 101 respectively to a two-channel amplifier 102 at a level of 1 volt peak, being amplified to a power level corresponding to peak voltage of 30. The amplifier 102 comprises two channels, one for the synchronising pulses and the other for the vision waveform, each of which is of conventional design and consists, for example, of two stages of inductively compensated resistance capacity circuits. This output of these stages is fed through a cathode follower.

The line synchronising pulses, after amplification, are applied to the sound pulse generator comprising the apparatus enclosed within the dotted rectangle 103 in which width modulated pulses of the type shown in Figure 3 are generated at a peak amplitude of 45 volts. The pulses have a maximum and minimum widths of 5 and 1 microseconds respectively and the trailing edge occurs 9 microseconds after the leading edge of the line synchronising interval. These width modulated pulses together with the complete vision waveform are fed into a mixing amplifier 104 of which a suitable circuit is illustrated in the diagram of Fig. 9. The resulting output contains sound pulses having an amplitude 1.4 times the peak vision signals and this waveform may be applied to the modulating circuits of a suitable transmitter.

The sound pulse generator 103 is more fully described in the specification of copending application Serial No. 682,484 but will be briefly described with reference to Figures 4, 5, 6, 7, and 8.

The width modulated sound pulse which has a fixed trailing edge is generated, fundamentally, by the mixing of a pulse which is modulated on both edges with a blanking waveform locked to the line synchronising pulse.

The line synchronising waveform as shown in Figure 5A is applied to a fed-back time constant integrating or sawtooth generating circuit 105 (Figure 4), a specific form of which is illustrated in Figure 6. In this circuit the line synchronising pulses are applied to the suppressor grid of the pentode $V_1$. The diode $V_2$, condenser $C_1$, and resistance $R_1$, form a peak voltmeter circuit in which the condenser $C_1$ is charged to a voltage equal to the peak amplitude of the pulses. The suppressor and assumes this peak negative voltage with respect to earth and thus only reaches earth potential at the peak of the synchronising pulse. Between pulses the valve $V_1$ is made non-conducting by this large negative suppressor voltage and it is rendered conducting during the period of the synchronising pulse. When $V_1$ is cut off the condenser $C_2$ charges exponentially to a voltage $(E_1-E_2)$. When $V_1$ is rendered conducting by the suppressor it can be shown that the anode voltage $E_a$ will increase substantially linearly with time.

The voltage $E_a$ will then have the form shown in Fig. 5B, and this waveform is then passed to a diode modulating circuit 106 (Fig. 4), a specific embodiment of which is shown in Fig. 7.

In this circuit, the waveform is applied to the cathode of the diode $V_3$ which is biassed positively by the resistor network $R_4$, $R_5$, $R_6$ and $P_1$. The diode will not conduct until $$E_a > E_3 \frac{(R_4+R_5)}{(R_4+R_5+R_6)}$$

As $E_a$ is practically linear with time, the instant at which $V_3$ will conduct will be a sensibly linear function of its cathode potential.

The cathode potential of $V_3$ is varied, at audio frequency, by the modulation applied across $R_5$. Thus the instant at which $V_3$ will conduct is a linear function of the instantaneous modulation amplitude. The resultant output waveform is shown in Fig. 5C.

This waveform (Fig. 5C) is then amplified and limited in a conventional limiting and shaping circuit 107 (Fig. 4) to give a width modulated pulse modulated on both edges (see Fig. 5D).

This waveform (Fig. 5D) is now mixed in the mixer 108 (Fig. 4) with a suitable blanking waveform produced by the blanking generator 109 (Fig. 4) from the line synchronising pulses, in order to obtain the required form of sound pulse. The requirements of the blanking waveform are such that the leading section only of the waveform (Fig. 5D) is transmitted.

If the blanking waveform and the waveform (Fig. 5D) are of the same sign (as shown in Fig. 5D and E) the blanking must consist of a pulse with a leading edge occurring before the leading edge of the waveform D. This leading edge of the blanking may conveniently coincide with the leading edge of the line synchronising pulse. Under these conditions the trailing edge of the blanking must occur at the instant when the trailing edge of the sound pulse is to occur, the composite waveform being as shown in Fig. 5F.

If the waveform (Fig. 5D) and the blanking waveform are of opposite sign then the blanking must have different characteristics. As can be seen from Fig. 5E, the leading edge of the blanking must occur at the correct instant to form the trailing edge of the sound pulse and the trailing edge of the blanking waveform must occur after the trailing edge of the pulse, to produce a composite waveform as shown in Fig. $5F^1$.

In the apparatus to be described, the blanking waveform and the modulated pulse waveform (Fig. 5D) are considered as being of the same sign. The blanking waveform (Fig. 5E) is generated by a relaxation oscillator locked to the leading edge of the line synchronising pulse. The two waveforms (D and E) are added in the mixing stage 108, a particular embodiment of which is shown in Fig. 8 and consists of two pentodes $V_4$ and $V_5$ with a common anode load.

The output waveform of this stage is shown in Fig. 5F and consists of the wanted sound pulse carried on the top of an unwanted pulse. This waveform (*f*) is then limited and amplified in the limiter 110 (Fig. 4) so that only the wanted sound pulse (see Fig. 5G) is presented to the output cathode follower stage 111 (Fig. 4).

The output of the sound pulse generator is of 45 volts peak amplitude.

The potentiometer $P_1$ (Fig. 7) controls the mean position of the leading edge of the sound pulse and the position of the trailing edge is controlled by varying the width of the blanking waveform.

The audio modulation applied across $R_5$ is supplied from a standard form of audio amplifier through a low pass filter 112 (Figs. 4 and 7) with a cut-off frequency of one half the line repetition frequency. This is to avoid interference between the modulation frequency and the lower sideband of the modulated pulses which coincide when the modulation frequency is equal to one half the pulse repetition frequency.

The output of the sound pulse generator enclosed in the dotted rectangle 103 (Fig. 4) and the video waveform, derived from the two channel amplifier 102 (Fig. 4) are passed to the main mixer unit 104 (Fig. 4). As shown in Fig. 9, this mixing stage is made up of two cathode followers ($V_6$ and $V_7$) connected in parallel. The mixed waveform is then passed to the output cathode followers and the modulating circuits of a suitable transmitter.

*Receiving circuits*

The receiver comprises the usual circuits for receiving and reconstituting the vision waveform, and also a sound receiver circuit the function of which is to separate the sound pulses from the vision waveform and to reconstitute the sound programme from the modulated pulses. The sound programme is preferably reconstituted in this receiver by passing the pulse train, after separation from the vision waveform, into a low pass filter. The pulse modulation will contain components of audio frequency together with harmonics of the pulse repetition frequency each of which is amplitude modulated.

If a train of pulses of repetition frequency $N_0$ is modulated in a sinusoidal manner at a frequency $N_1$, components of the following frequencies will be produced, $N_1$, $N_0 \pm N_1$, $N_0$ and higher harmonics. The lower sideband $N_0-N_1$ will coincide with the modulation frequency $N_1$ when $$N_1 = \frac{N_0}{2}$$

At the frequencies above $$\frac{N_0}{2}$$

the modulation frequency will be higher than the lower sideband $N_0-N_1$ and the component $N_1$ will interfere with the inverted frequency $N_1-N_1$. It follows therefore that the modulation frequency must not exceed one half the repetition frequency, and the low pass filter must have a cut off frequency not greater than one half of the pulse frequency must be employed.

It is usual for the output waveform of the vision receiver used with the present British television service to be negative in sign. This is due to the requirements of the synchronising separator stage and leads to a more economical receiver design. The normal peak vision output at the detector anode is of the order of 22 volts. This stage will accommodate a peak pulse signal of 30 volts.

The first problem in the receiver design is to separate the sound pulses from the vision waveform. This is most easily accomplished if the waveform has a positive sign. The waveform is therefore passed in the first section of the double triode valve $V_1$ (Fig. 10). Negative feedback is applied to this stage by a variable unbypassed cathode resistances $R_1$, so that the amplifier will substantially accept the full waveform amplitude.

By adjusting the bias on this stage the peak of the sound pulse can, as shown in Fig. 11 be made more negative than the grid cut off voltage of the valve, thus removing the noise on the peaks of the sound pulses.

The positive sign output from this stage is of the order of 60 volts peak of which the vision waveform occupies about 45 volts. This output is then fed to the grid of the other half of $V_1$ through a time constant circuit $C_1R_2$ which is long compared with the repetition rate. This section of $V_1$ is operated without applied bias so that the sound pulses cause the coupling condenser $C_1$ to be charged to a negative potential equal to the peak amplitude of the sound pulses. As an alternative to cutting of the peaks of the sound pulses by suitable bias on the first stage of $V_1$ a series resistor $R_4$ may be included in the grid circuit of the valve in order to remove noise along the top of the pulse.

This section of the valve will then conduct only during the peaks of the sound pulses applied and therefore the output from this stage will contain only slices cut from the sound pulse waveform.

As has been explained above, it is necessary for the sound receiver to have a frequency characteristic falling sharply for frequencies above half the repetition frequency. This is accomplished, in part, by the resistance capacity filter $R_3$, $C_2$.

It now only remains to recover the sound programme from the modulated pulse output. This is effected in the final amplifier by the use of frequency-selective negative feedback in the cathode circuit. The tuned circuit $L_1C_3$ is tuned to the pulse repetition frequency (10,125 cycles per second in the British system) so that this stage will reject the pulse repetition frequency. Higher harmonic components are rejected by the resistance capacity filter already mentioned.

Because of the finite Q (about 20) of the cathode rejection circuit it will also be effective in attenuating the inversion components lying between half the pulse repetition frequency and the pulse repetition frequency.

In order to obtain a slight improvement in the filtering characteristic in the region of half the pulse repetition frequency, the condenser $C_4$ is made to resonate with the leakage inductance presented at the primary terminals of the output tranformer $T_0$.

It will be appreciated that since the sound pulse is of greater amplitude than the peak vision signal, it would, unless suppressed, manifest itself as a white band on the screen of the cathode ray tube. The sound pulses occur during the line synchronising interval and therefore the band on the tube would be formed by the line flyback traces. This sound band may be suppressed by the application to the grid of the cathode ray tube of a negative pulse during the period of the line synchronising interval. A suitable pulse may be obtained from the voltage developed across the line deflector coils on the cathode ray tube.

If the amplitude of the sound pulse transmitted is less than the peak vision signal, the sound pulse may be separated from the vision waveform by the application of a blanking waveform to the sound pulses in such a manner that their amplitude becomes greater than the peak vision signal as described in the specification of co-pending application No. 683,699.

The system which has been described for transmitting vision and sound on a common wavelength, possesses the following advantages:

(1) The sound receiver in pulse reception is considerably simplified and it could therefore be produced more cheaply.

(2) A separate television-sound transmitter is no longer required.

(3) The effect of impulsive interference on the system would be much less marked than with amplitude modulation.

(4) The channel width required for television and the accompanying sound transmissions is reduced.

(5) Often in localities where a large signal was received there was a certain amount of interference between sound and vision owing to the filters separating the sound and vision programmes. This tended to be especially troublesome where some of the stages were used to amplify both the sound and vision signals, for any non-linearity in these stages produced intermodulation products. These troubles, of course, disappear in the new system.

(6) The sound pulses have a fixed height, and could therefore be used as a reference level for automatic volume control at the receiver.

(7) The sound programme level remains constant, within wide limits, irrespective of fading of the transmission, because the receiver is operated by a slice of the sound pulse, this slice having a constant amplitude independent of the signal level provided the limiters are operative.

(8) The receiving antenna need only cover the vision band of frequencies; this results in a slight increase in efficiency.

(9) Since the television-sound transmitter is eliminated, problems of interference between sound and vision antennae disappear.

With regard to future developments quite clearly the fidelity of the sound programme will rise with the number of lines. A 1,000 line picture would admit of sound programmes having a flat response to frequencies of about 10 kc./sec. being transmitted.

Although the system described is primarily for the purpose of transmitting a combined sound and vision waveform, the same equipment could be used, with the existing British television standards, for transmitting 8 alternative sound pulse programmes in the periods when the vision transmitter was out of use. The waveform for this is shown in Fig. 12. These alternative channels could be received on the normal television pulse sound receiver. The different channels would be selected by push buttons on the receiver which could control the operation of gate valves or blanking pulses in timed relation to the synchronising pulses. If the cost of providing 8 alternative programmes were too great then the channels could be distributed as shown in Fig. 12 to give four high quality sound transmission.

As the definition of a television picture is raised the amount of space in the synchronising period for the sound pulse is effectively increased. Although the line synchronising period decreases as $$\frac{1}{n}$$

(where $n$ is the number of lines scanned each picture), the system will deal with pulses having a width proportion to $$\frac{1}{n}2$$

so the sound pulses may be made thinner at a greater rate than the synchronising period is decreased. With increasing definition, two sound pulses could be placed in each line synchronising pulses, which would allow stereophonic sound to be transmitted if necessary. One of these pulses might be used in television colour transmissions to provide signals for switching the line colour sequence at the receiver.

It will be understood that, although a particular embodiment of the invention has been described in detail, various modifications may be made without departing from the spirit of the invention. For example, the height of the pulses in a width-modulated system could be varied in a regular manner to provide colour-synchronising impulses in a colour television system. Furthermore, although the invention has been described with reference to the positive modulation type of waveform as used in the British television system, it will be understood that the invention is equally applicable to waveform with negative video modulation. In this case the sound pulses could also appear in the waveform with negative modulation during the synchronising periods, or could appear as positive pulses standing on the tops of the synchronising pulses.

We claim:

1. Transmitting apparatus for a combined sound and television system in which the sound intelligence is transmitted over the same channel as the picture intelligence and the synchronising signals as a series of modulated pulses during the line synchronising pulses, comprising means for producing a waveform of the picture intelligence to be transmitted, means for producing line and frame synchronising pulses, means for deriving from said line synchronising pulses a series of constant amplitude pulses having a mean repetition frequency equal to the line repetition frequency, means for width modulating said pulses in accordance with the sounds to be transmitted such that the trailing edges of the sound pulses are fixed and the leading edges vary with the modulation, and means for mixing the picture intelligence waveform and line and frame synchronising pulses with the sound modulated pulses so that the sound modulated pulses are positioned within the line synchronising pulses and spaced from both the leading and trailing edges thereof.

2. Transmitting apparatus for a combined sound and television system in which the sound intelligence is transmitted over the same channel as the picture intelligence and the synchronising signals as a series of modulated pulses during the line synchronising pulses, comprising means for producing a waveform of the picture intelligence to be transmitted, means for producing line synchronising pulses, means for deriving from said line synchronising pulses a series of constant amplitude pulses having a mean repetition frequency equal to the line repetition frequency, means for time modulating said pulses in accordance with the sounds to be transmitted, means for mixing the picture intelligence waveform and line synchronising pulses with the sound modulated pulses so that the sound modulated pulses are positioned within the line synchronising pulses and spaced from both the leading and trailing edges of the line synchronising pulses and with the leading edges of the sound pulses separated from the line synchronising edges of the synchronising pulses by a time duration exceeding two microseconds.

3. A combined sound and television system in which the sound intelligence is transmitted over the same channel as the picture intelligence and the synchronising signals as a series of modulated pulses during the line synchronising pulses, comprising means for producing a waveform of the picture intelligence to be transmitted, means for producing line synchronising pulses, means for deriving from said line synchronising pulses a series of constant amplitude pulses having a mean repetition frequency equal to the line repetition frequency, means for width modulating said pulses in accordance with the sounds to be transmitted such that the trailing edges of the sound pulses are fixed and the leading edges vary with the modulation, a low-pass filter having a cut-off frequency which is not greater than one half of the pulse repetition frequency, means for feeding the sound signals to said pulse modulating means through said low-pass filter, means for mixing the picture intelligence waveform and line synchronising pulses with the width-modulated sound pulses so that the sound pulses are positioned within the line synchronising pulses and spaced from both the leading and trailing edges of the line synchronising pulses and have an amplitude which is greater than the amplitude of either the picture intelligence or the synchronising signals, means for transmitting the composite waveform, and a receiver for the transmitted composite waveform, said receiver incorporating amplitude limiting means for cutting off the peaks of the sound pulses, amplitude limiting means for separating the greater amplitude sound pulses from the remainder of the composite waveform, means for recovering the sound signals from the separated modulated sound pulses, a low-pass filter in the sound channel of the receiver having a cut-off frequency which is not greater than one half of the pulse repetition frequency, means for reproducing the sound signal, a line oscillator in the receiver, a frame oscillator in the receiver, means for differentiating the received synchronising pulses, and means for triggering the line and frame oscillators from the differentiated pulses produced by the synchronising edges of the synchronising pulses, the leading edges of the sound pulses having a minimum separation from the line synchronising edges of the synchronising pulses which exceeds the length of the pulse produced by the line oscillator, a picture reproducing device, means for controlling the scanning of said picture reproducing device by said line and frame oscillators, and means for modulating the picture reproducing device in accordance with the picture intelligence contained within the received waveform.

4. Transmitting apparatus comprising means for producing a train of synchronising pulses, means for deriving from said synchronising pulses a series of constant amplitude pulses having a mean repetition frequency equal to the repetition frequency of the synchronising pulses, means for width-modulating said derived pulses with an audio frequency, such that the trailing edges of the sound pulses are fixed in time and the leading edges vary with the modulation, means for mixing the modulated sound pulses in opposite phase with the synchronising pulses and in such timed relation that the sound modulated pulses are positioned within the synchronising pulses and spaced from both the leading and trailing edges thereof.

5. A combined sound and television system in which the sound intelligence is transmitted over the same channel as the picture intelligence and the synchronising signals as a series of modulated pulses during the line synchronising pulses, comprising means for producing a waveform of the picture intelligence to be transmitted, means for producing line and frame synchronising pulses, means for deriving from said line synchronising pulses a series of constant amplitude pulses having a mean repetition frequency equal to the line repetition frequency, means for width modulating said pulses in accordance with the sounds to be transmitted such that the trailing edges of the sound pulses are fixed and the leading edges vary with the modulation, means for mixing the picture intelligence waveform and line and frame synchronising pulses with the width-modulated sound pulses so that the sound pulses are positioned within the line synchronising pulses and spaced from both the leading and trailing edges of the line synchronising pulses, means for transmitting the composite mixed waveform, and a receiver for the transmitted composite waveform, said receiver incorporating means for separating the sound pulses from the remainder of the composite waveform, means for reproducing the sound signals from the separated modulated sound pulses, line and frame oscillators in the receiver, means for controlling the line and frame oscillators by the received line and frame synchronising pulses, a picture reproducing device, means for controlling the scanning of said picture reproducing device by said line and frame oscillators, and means for modulating the picture reproducing device in accordance with the picture intelligence contained within the received waveform, wherein the leading edges of the sound pulses have a minimum separation from the line synchronising edges of the synchronising pulses which exceeds the duration of the pulse produced by said line oscillator in the receiver.

6. A combined sound and television system in which the sound intelligence is transmitted over the same channel as the picture intelligence and the synchronising signals as a series of modulated pulses during the line synchronising pulses, comprising means for producing a waveform of the picture intelligence to be transmitted, means for producing line synchronising pulses, means for deriving from said line synchronising pulses a series of constant amplitude pulses having a mean repetition frequency equal to the line repetition frequency, means for width modulating said pulses in accordance with the sounds to be transmitted such that the trailing edges of the sound pulses are fixed and the leading edges vary with the modulation, means for mixing the picture intelligence waveform and line synchronising pulses with the width modulated sound pulses so that the sound pulses are positioned within the line synchronising pulses and spaced from both the leading and trailing edges of the line synchronising pulses, means for transmitting the composite mixed waveform, and a receiver for the transmitted composite waveform, said receiver incorporating means for separating the sound pulses from the remainder of the composite waveform, means for recovering the sound signals from the separated modulated sound pulses, means for reproducing the sound signals, a line oscillator in the receiver, a frame oscillator in the receiver, means for differentiating the received synchronising pulses, and means for triggering the line oscillator from the differentiated pulses produced by the synchronising edges of the synchronising pulses.

DENNIS ILLINGWORTH LAWSON.
ARTHUR VALENTINE LORD.

REFERENCES CITED

The following references are of record in the file of this patent:

UNITED STATES PATENTS

| Number | Name | Date |
|---|---|---|
| 2,146,876 | Zworykin | Feb. 14, 1939 |
| 2,213,938 | Bennett | Sept. 3, 1940 |
| 2,227,108 | Roosenstein | Dec. 31, 1940 |
| 2,257,562 | Branson | Sept. 30, 1941 |
| 2,266,194 | Guanella | Dec. 16, 1941 |
| 2,268,001 | Farnholz | Dec. 30, 1941 |
| 2,301,504 | Batchelor | Nov. 10, 1942 |
| 2,326,515 | Bartelink | Aug. 10, 1943 |
| 2,350,902 | Kallmann | June 6, 1944 |
| 2,391,776 | Fredendall | Dec. 25, 1945 |
| 2,401,384 | Young | June 4, 1946 |
| 2,420,374 | Houghton | May 13, 1947 |
| 2,437,300 | Labin | Mar. 9, 1948 |
| 2,465,371 | Grieg | Mar. 29, 1949 |
| 2,563,684 | Lord | Aug. 7, 1951 |

FOREIGN PATENTS

| Number | Country | Date |
|---|---|---|
| 564,511 | Great Britain | Oct. 2, 1944 |

OTHER REFERENCES

Proc. I. R. E. (pages 49-61), February 1946.

Wireless World (pages 371, 372), December 1945.